United States Patent [19]

Ruebush et al.

[11] Patent Number: 4,839,054

[45] Date of Patent: Jun. 13, 1989

[54] PROCESS FOR REMOVING WATER-SOLUBLE ORGANICS FROM PRODUCED WATER

[75] Inventors: Ann M. Ruebush, San Francisco; Samuel L. Davis, Jr., Solvang; Vern A. Norviel, Castro Valley, all of Calif.

[73] Assignee: Chevron Research Company, San Francisco, Calif.

[21] Appl. No.: 112,844

[22] Filed: Oct. 23, 1987

[51] Int. Cl.[4] .............................................. C02F 1/26
[52] U.S. Cl. .................................... 210/639; 210/705; 210/708; 210/725; 210/908; 210/909
[58] Field of Search ............... 210/634, 639, 704, 705, 210/708, 725, 729, 908, 909

[56] References Cited

U.S. PATENT DOCUMENTS

| | | | |
|---|---|---|---|
| 2,761,563 | 9/1956 | Waterman et al. | 210/639 |
| 3,168,585 | 2/1965 | McCarthy | 210/634 |
| 3,884,803 | 5/1975 | Traylor | 210/704 |
| 3,940,334 | 2/1976 | Miyazawa | 210/639 |
| 4,001,114 | 1/1977 | Joseph et al. | 210/705 |
| 4,401,570 | 8/1983 | Blytas et al. | 210/639 |

Primary Examiner—Peter Hruskoci
Attorney, Agent, or Firm—S. R. La Paglia; E. J. Keeling

[57] ABSTRACT

We disclose a process for removing water-soluble organics from produced water. The process comprises: acidifying the produced water with acid; contacting the acidified with a free oil to form a mixture; agitating the mixture to produce a thoroughly mixed phase; and separating the phase to produce a free oil phase and a clean water phase.

2 Claims, 1 Drawing Sheet

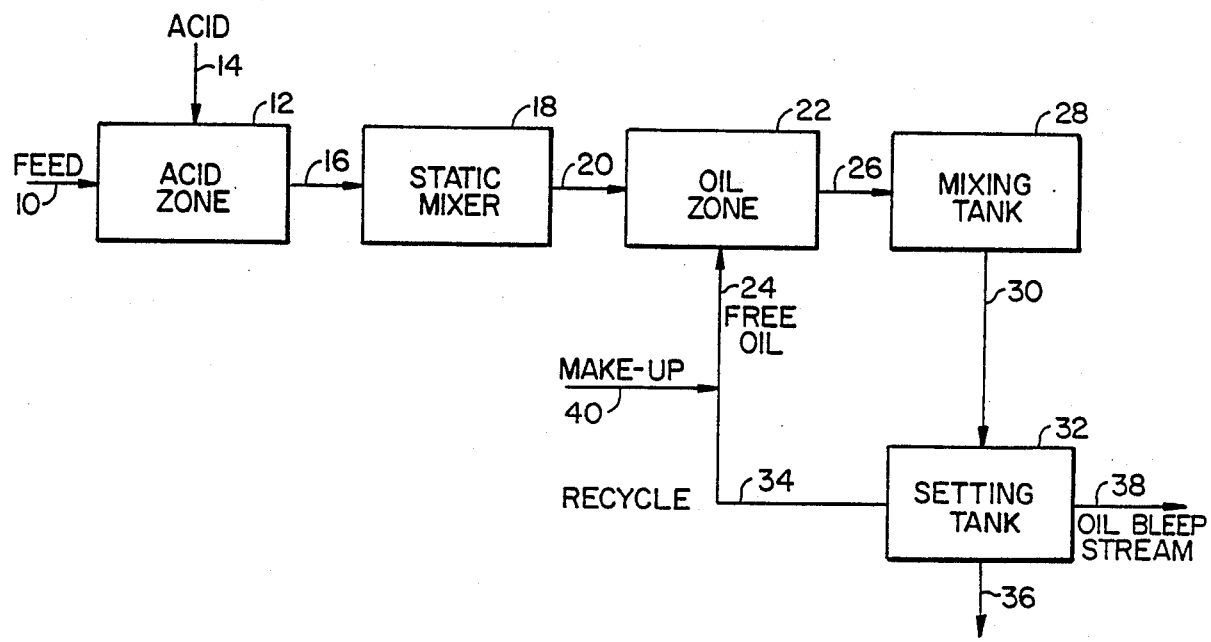
FIG._1.

PROCESS FOR REMOVING WATER-SOLUBLE ORGANICS FROM PRODUCED WATER

BACKGROUND OF THE INVENTION

The present invention relates to a three-step process for removing water-soluble organics from produced water. In the first step, the organics-containing water is contacted with acid to reduce the solubility of the dissolved organics. In the second step, the acidified water is contacted and thoroughly mixed with a free oil to coalesce the dissolved organics. In the third step, the free oil phase is separated from the aqueous phase to produce substantially organic-free produced water.

A variety of industrial processes generate aqueous waste streams containing contaminating amounts of organic compounds. Before such streams can be discharged into a receiving body of water, the organics content must be substantially reduced to meet state and federal regulatory standards.

For example, offshore oil platform operations may generate production water waste streams. Some produced water contains naturally-occurring brines associated with and in contact with naturally-occurring petroleum in subsurface geologic formations and is produced as a consequence of producing the petroleum. The water may contain significant amounts of dissolved organic acids and other contaminating hydrocarbons. The main problem is that it contains carboxylic acid salts such as salts of naphthenic acids. If not removed, these contaminants are measured as oil and grease when the water is acidified and freonextracted, pursuant to EPA gravimetric test methods. Thus, it is desirable to treat such water so that it can be discharged without violating regulatory standards.

Produced waters that do not contain dissolved organic acids can be treated by settling (i.e., gravity separation) and flotation techniques. But we have found conventional oil/water separation techniques to be inadequate in removing water-soluble organics. For example, when water-soluble organics are present, high levels of oil and grease are measured even after gravity separation followed by induced air flotation.

Previous workers in the field attempted to remove dissolved organic contaminants by acidification. They believed that the dissolved organic acids would form a free oil phase at low pH's and could be removed by settling or flotation. For example, U.S. Pat. No. 4,401,570 discloses a method of removing organic esters from waste water using acidification. We have found, however, that these organics are too finely dispersed to allow them to settle or float. Thus, the organics remained and continued to result in unacceptable levels of oil and grease in the produced water stream.

Accordingly, it is the principle object of this invention to economically remove water-soluble organics from contaminated produced water streams.

In a preferred embodiment, the process of this invention comprises: acidifying the produced water, having 40–400 ppm dissolved organics, with sulfuric acid; contacting the acidified water with a free oil comprising a crude oil having an API gravity ranging from about 22° to about 35° to form a mixture; agitating the mixture to produce a thoroughly mixed phase; and separating the mixed phase to produce a free oil phase and a clean water phase.

SUMMARY OF THE INVENTION

The invention concerns a process for removing water-soluble organics from produced water. The process comprises: acidifying the produced water with acid; contacting the acidified water with a free oil to form a mixture; agitating the mixture to produce a thoroughly mixed phase; and separating the phase to produce a free oil phase and a clean water phase.

BRIEF DESCRIPTION OF THE DRAWINGS

FIG. 1 is a schematic flow diagram showing the sequence of steps in the process of the present invention.

DETAILED DESCRIPTION OF THE INVENTION

In the remainder of the specification, we will describe a waste treatment system suitable for removing water-soluble organics from produced water. Those skilled in the art of waste water treatment will appreciate that the volumes and amounts of reactants can be varied widely to accommodate the specific make-up of any produced water.

In general, the water-soluble organics are dissolved metal salts of oxygenated hydrocarbons, alkane acids, and cyclic acids, specifically carboxylic acid salts and long-chain organic acid salts. Often, they are naphthenic acid salts. The naphthenic acid salts are defined as monocarboxylic acids of the naphthene (alicyclic) series of hydrocarbons. Their general formula may be written $R(CH_2)n\ COOH$ where R is a cyclic nucleus composed of one or more rings. These rings are usually five-membered (cyclopentene) and may be alkylated.

Naphthenic acids occur in almost all crudes in widely varying amounts. The acid content of a variety of American crudes runs from about 0.03 to 3.0 wt. %. In general, the lower the paraffin content, the higher the acid content. In the typical practice of the invention, produced water contains from about 40 ppm to about 400 ppm of organics dissolved therein.

In a preferred embodiment, the present invention is operated as a continuous process. Turning now to FIG. 1, this process is illustrated. A feed water, comprising dissolved organics, is introduced into acid zone 12 through a conduit 10. An acid is introduced into acid zone 12 through a conduit 14 to produce an acidified water mixture of lowered pH.

Specifically, acid is added to the water to lower the pH to below 6.0, preferably between 4.0 and 6.0. The optimum pH depends of which organic species are present that need to be protonated. Although still lower pH's may be employed, generally these will be too corrosive and will adversely impact materials of construction or require more expensive equipment. If, however, lower pH's are required, acid-resistant materials such as titanium, glass or plastics may be used.

Although any acid can be added, we prefer using a strong mineral acid. These include hydrochloric acid, sulfuric acid, and phosphoric acid. Sulfuric acid is most desirable from an economic standpoint because it produces two hydronium ions per mole of acid. But if the water contains significant levels of barium, calcium, or strontium, it will be necessary to use hydrochloric acid instead of sulfuric acid, even through it is more expensive, in order to prevent precipitation of inorganic sulfates. The type and amount of acid used depends on the composition of the produced water. For example, highly buffered water requires much more acid to reach the desired pH level than does less buffered water.

The acidified water is withdrawn from acid zone 12 and introduced into a static mixer 18 via a conduit 16 to contact the water and acid. The mixture is withdrawn from static mixer 18 and introduced into oil zone 22 via a conduit 20. A free oil is introduced into the oil zone 22 through a conduit 24 to contact and admix with the acidified water.

The free oil may be aliphatic, cycloaliphatic, aromatic or mixtures of these. These include crude oil, kerosene, gas oil, cyclohexane, benzene, toluene, methyl cyclohexane, and the like. We have found that crude oil works particularly well and that light crudes (e.g., 35° API) and heavier crudes (e.g., 22° API) work equally well.

The oil-acidified-water mixture is withdrawn from oil zone 22 and introduced into a mixing tank 28 via a conduit 26. More than one mixing tank can be used. For example, several mixing tanks can be used in series to provide more efficient mixing. Each tank is constructed of acid resistant material and is preferably equipped with a mixing device to rapidly mix its contents. Preferably, the contents of each tank should be thoroughly mixed, but not so thoroughly so as to create an emulsification. The tank should be sized to provide about one hour of residence time. Alternatively, mixing can be achieved by passing the mixture through a static mixer in-line although emulsification may be a problem.

When acid is added to the water, if sulfide and bicarbonate anions are present, they are protonated to form hydrogen sulfide and carbon dioxide. These gases are primarily liberated in the mixing tank, so this vapor must be routed to a sour gas handling system. If a substantial amount of this gas is released, it provides good mixing of the tank contents in addition to the mechanical mixer.

The mixture from mixing tank 28 is introduced into settling tank 32 through a conduit 30. Settling tank 32 provides a residence time of approximately four hours to allow for good oil/water separation. It has internal baffling to minimize "short-circuiting" of flow and free oil carry-over. An oil skim line removes the free oil that accumulates.

It is possible to recycle the oil stream as long as a bleed stream and fresh make-up are used. For example, when the separated free oil is withdrawn from settling tank 32 through a conduit 34 it can be recycled to oil zone 22 to aid in the preparation of the mixture produced therein. For this a bleed stream 38 and a make-up stream 40 are necessary. But if the oil can be separated cleanly from the water in the settling tank or in another tank downstream and combined with other crude or recovered oil streams, a one-through oil use can be used as an alternative. In either case, the water is withdrawn from the settling tank 32 through a conduit 36 and sent to further processing in an induced gas flotation unit (IGF).

In an alternative embodiment, a corrugated plate interceptor can be used in place of the settling tank. Alternatively, such an interceptor could be used in addition to the settling tank for particularly difficult separations.

In addition to operating my invention as a continuous process, it may also be operated as a batch process. The organics-containing produced water is charged to an acidification tank which already contains an amount of free oil. Acid is then charged to the tank and the contents are thoroughly admixed by a mechanical mixer. After mixing, the water is removed from the mixing tank and introduced into a settling tank or allowed to settle in the mixing tank with the mixer turned off. The organics-free water is recovered and the separated oil is charged to the mixing tank for the next batch.

Water from the settling tank is fed into an IGF. To avoid emulsification problems, the IGF should be fed by gravity or by a low shear pump rather than by a centrifugal pump.

The feed to the IGF is low in pH, and will usually be hot, and have a high salt content. In addition, while as much as 80% of the hydrogen sulfide is removed during the acidification step, the vapor at the flotation unit can still have a high concentration of hydrogen sulfide. It is unlikely that a typical carbon-steel flotation unit can withstand these kinds of operating conditions. Thus, a stainless steel or other reinforced alloy vessel must be used. Some IGF units are available in fiberglass which would also be acceptable.

The process according to the invention may suitably reduce the content or organics in the produced water by about 75-85%. As a rule, the process will not be applied to water containing less than about 40 ppm of total organics. Depending on the type and concentration of naphthenic acids removed from the water, it may be desirable to recover them from the free oil stream in a concentrated form for chemical use or sale.

The present invention will be illustrated with reference to the following examples, which are only given for the purpose of illustration and not to be interpreted as limiting thereto.

EXAMPLE WITH ACIDIFICATION ONLY

Produced water with an oil and grease content of 246.6 ppm (as determined by the gravimetric method) was acidified to pH 4 using hydrochloric acid. The acidified water was allowed to settle for three hours and then it was sent to an IGF unit. At the outlet of the IGF, the oil and grease averaged 125 ppm (the average of six samples taken over six hours of operation). So oil and grease reduction of about 50% was achieved.

EXAMPLE WITH OIL CONTACTING

Produced water having a total oil and grease content of 246.5 ppm (as determined by the gravimetric method) was acidified to pH 4 using hydrochloric acid. The acidified water was then contacted with 1500 ppm crude oil (gravity 22 API) through an in-line static mixer. The acidified water oil-mixture was allowed to settle for three and one-half hours and then it was sent to an IGF unit. At the outlet of the IGF, the oil and grease content was in the range of 21-39 ppm (three samples taken over three hours of operation). So oil and grease reduction of about 85% was achieved.

In both cases, cationic polymers (Betz F7 and F8) were added to the acid tank, at a dose of 12 ppm each, with the water before acidification.

Then, prior to entering the flotation unit, the water was conditioned using two polymers which were injected separately. First, an anionic polymer (Betz 1123L) was added at a dose of 1 ppm. Then, F8 was added in doses varying from 3-15 ppm.

Following the flotation unit, the water was sent to a sand filter and then to a carbon bed. Although the primary purpose of the sand filter was to protect the carbon from carry-over of free oil or particulates, a small reduction in oil and grease was achieved across the sand filter, possibly due to the addition of 25 ppm of alum upstream of the sand filter.

Water leaving the sand filter had an oil and grease content of 63–100 ppm in the acid only case, and 25–35 ppm in the acid and oil case. Across the carbon bed, a further reduction in oil and grease was accomplished. Water leaving the carbon beds had an average oil and grease content of 34 ppm in the acid only case, and 6 ppm in the acid and oil case.

What is claimed is:

1. A process for removing water-soluble organics from oil field produced water, said organics including one or more dissolved metal salts of oxygenated hydrocarbons, alkane acids, and cyclic acids comprising:
   a. acidifying said oil field produced water with a mineral acid sufficient to achieve an acidified water having a pH of 6.0 or less;
   b. contacting said acidified water with an effective amount of crude oil having an API gravity of from about 22 API to 35 API to form a mixture;
   c. agitating said mixture to produce a thoroughly mixed emulsion free phase; and
   d. separating said mixed phase to produce a crude oil phase which includes at least the major portion of said water-soluble organics and a substantially clean water phase.

2. A batch process for removing water-soluble organics from oil field produced water said organics including one or more dissolved metal salts of oxygenated hydrocarbons, alkane acids and cyclic acids comprising:
   a. charging said oil field produced water to an acidification vessel containing an effective amount of a crude oil having an API gravity of from about 22° API to 35° API to produce an oil-water mixture;
   b. charging an effective amount of a mineral acid to said vessel effective to lower the pH of said mixture to below 6.0;
   c. agitating said mixture to produce a thoroughly mixed emulsion free phase;
   d. settling said phase to produce a crude oil phase which includes at least the major portion of said water-soluble organics and a substantially clean water phase; and
   e. separating said substantially clean water phase from said crude oil phase.

* * * * *